United States Patent
Kato et al.

(10) Patent No.: US 10,926,797 B2
(45) Date of Patent: Feb. 23, 2021

(54) PARKING ASSISTANCE APPARATUS

(71) Applicant: AISIN SEIKI KABUSHIKI KAISHA, Kariya (JP)

(72) Inventors: Masaya Kato, Susono (JP); Norio Imai, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 228 days.

(21) Appl. No.: 15/883,836

(22) Filed: Jan. 30, 2018

(65) Prior Publication Data

US 2018/0244312 A1    Aug. 30, 2018

(30) Foreign Application Priority Data

Feb. 28, 2017 (JP) ................. 2017-037433

(51) Int. Cl.
  B62D 15/02    (2006.01)
  B60W 30/06   (2006.01)
  B60W 50/14   (2020.01)
(52) U.S. Cl.
  CPC ......... B62D 15/0285 (2013.01); B60W 30/06 (2013.01); B60W 50/14 (2013.01)
(58) Field of Classification Search
  CPC .... B62D 15/0285; B60W 50/14; B60W 30/06
  USPC .......................................................... 701/41
  See application file for complete search history.

(56) References Cited

U.S. PATENT DOCUMENTS

| 2009/0157260 A1* | 6/2009 | Lee ................... | B62D 15/0285 701/41 |
| 2014/0188339 A1* | 7/2014 | Moon ................ | B62D 15/0285 701/41 |
| 2016/0068158 A1* | 3/2016 | Elwart ................. | B60W 50/10 701/41 |
| 2016/0075374 A1* | 3/2016 | Yamashita ........... | B62D 15/027 701/41 |
| 2016/0075375 A1  | 3/2016 | Yamashita et al. | |

(Continued)

FOREIGN PATENT DOCUMENTS

DE   102012203235 A1    9/2013
EP        0835796 A2 *   4/1998  ......... B62D 15/0285

(Continued)

OTHER PUBLICATIONS

Communication dated Jul. 24, 2018 from the European Patent Office in counterpart European application No. 18159253.6.

(Continued)

Primary Examiner — Jonathan M Dager
Assistant Examiner — Jean W Charleston
(74) Attorney, Agent, or Firm — Sughrue Mion, PLLC

(57) ABSTRACT

A parking assistance apparatus includes: a control unit configured to: perform a steering control processing that controls steering of a vehicle and a vehicle speed control processing that controls a traveling speed of the vehicle when the vehicle enters or exits from a parking space; terminate a first processing that is one of the steering control processing and the vehicle speed control processing when a predetermined condition is satisfied after the vehicle starts to enter or exit from the parking space; and continue a second processing that is one of the steering control processing and the vehicle speed control processing other than the first processing.

12 Claims, 6 Drawing Sheets

(56) References Cited

U.S. PATENT DOCUMENTS

| | | | |
|---|---|---|---|
| 2016/0311429 A1* | 10/2016 | Holland-Letz | B60W 40/02 |
| 2016/0313731 A1* | 10/2016 | Leppanen | B60K 35/00 |
| 2017/0029028 A1 | 2/2017 | Kiyokawa | |
| 2017/0259850 A1* | 9/2017 | Yamashita | B62D 15/028 |
| 2018/0057057 A1* | 3/2018 | Iwami | B62D 15/028 |
| 2018/0057075 A1* | 3/2018 | Marchlewski | B62D 25/10 |

FOREIGN PATENT DOCUMENTS

| | | | |
|---|---|---|---|
| EP | 0835796 A2 | 4/1998 | |
| EP | 1864881 A1 * | 12/2007 | B60T 7/22 |
| EP | 1864881 A1 | 12/2007 | |
| JP | 2005-14780 A | 1/2005 | |
| JP | 2007-326415 A | 12/2007 | |
| JP | 2014-121984 A | 7/2014 | |
| WO | 2014/203334 A1 | 12/2014 | |

OTHER PUBLICATIONS

Communication dated Dec. 8, 2020, issued by the Japanese Patent Office in application No. 2017-037433.

* cited by examiner

PARKING ASSISTANCE APPARATUS

CROSS REFERENCE TO RELATED APPLICATIONS

This application is based on and claims priority under 35 U.S.C. § 119 to Japanese Patent Application 2017-037433, filed on Feb. 28, 2017, the entire contents of which are incorporated herein by reference.

TECHNICAL FIELD

The embodiment disclosed herein relates to a parking assistance apparatus.

BACKGROUND DISCUSSION

A parking assistance system which controls driving of a vehicle when a vehicle enters or exits from a parking space is implemented by various methods, using an ultrasonic sensor, a camera, or the like. Incidentally, in the parking assistance system, it is necessary to study a method of transferring the driving of the vehicle to the driver when entering or exiting of the vehicle to or from the parking space is completed from the view point of safety, ease of understanding, and ease of use. Generally, the parking assistance system determines whether or not control of the driving of the vehicle is terminated, depending on whether or not the vehicle reaches a target position, or whether or not a pre-set exiting condition is satisfied. See, e.g., JP 2014-121984 A (Reference 1).

The parking assistance system terminates the control of the driving of the vehicle with the expectation that the driver will perform driving simultaneously when the control of driving of the vehicle is terminated. However, the vehicle may approach an obstacle in the vicinity thereof due to the delayed driving of the driver.

SUMMARY

A parking assistance apparatus according to an aspect of this disclosure includes, as an example, a control unit configured to: perform a steering control processing that controls steering of a vehicle and a vehicle speed control processing that controls a traveling speed of the vehicle when the vehicle enters or exits from a parking space; terminate a first processing that is one of the steering control processing and the vehicle speed control processing when a predetermined condition is satisfied after the vehicle starts to enter or exit from the parking space; and continue a second processing that is one of the steering control processing and the vehicle speed control processing other than the first processing.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating an exemplary vehicle to which a parking assistance apparatus according to an embodiment is applied in the state where a portion of a vehicle interior is seen through;

DETAILED DESCRIPTION

An exemplary embodiment disclosed here will be described below. A configuration that will be described below, and operations, results, and effects that are brought about by the configuration are examples. It is possible to implement this disclosure by a configuration other than the configuration disclosed in the following embodiment, and it is possible to achieve at least one of various effects or derivative effects that are based on a basic configuration.

Figure 1:
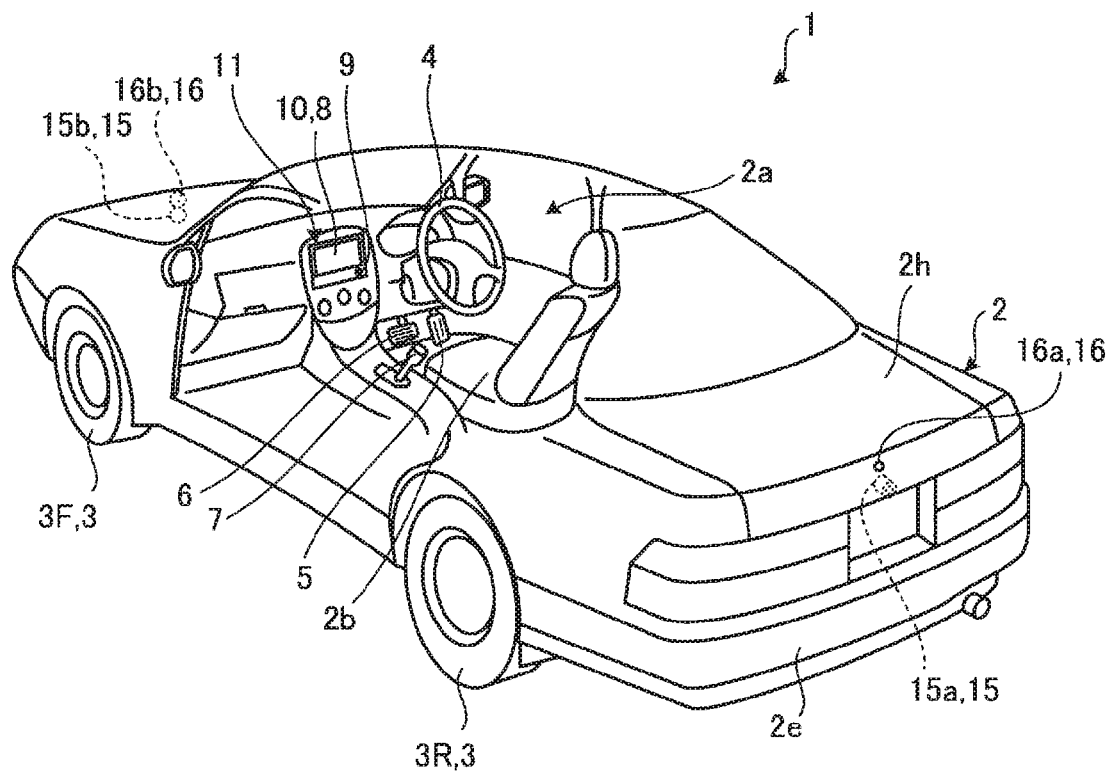

FIG. 1 is a perspective view illustrating an exemplary vehicle to which a parking assistance apparatus according to an embodiment is applied in the state where a portion of the vehicle interior is seen through. A vehicle 1 may be an automobile that uses an internal combustion engine as a driving source (an internal combustion engine automobile), may be an automobile that uses an electric motor as a driving source (an electric automobile, a fuel battery automobile, or the like), or may be an automobile that uses both of the internal combustion engine and the electric motor as driving sources (a hybrid automobile). Furthermore, the vehicle 1 may be equipped with various transmissions and various apparatus (a system, a component, and the like) required for driving the internal combustion engine or the electric motor. Furthermore, the types, number, layout and the like of the apparatuses related to the driving of wheels 3 in the vehicle 1 can be set in various ways.

As illustrated in FIG. 1, the vehicle 1 includes a vehicle body 2, a steering unit 4, an accelerating operation unit 5, a braking operation unit 6, a gear-shifting operation unit 7, and a monitoring device 11.

The vehicle body 2 has a vehicle interior 2a into which an occupant of the vehicle 1 gets. Within the vehicle interior 2a, the steering unit 4, the accelerating operation unit 5, the braking operation unit 6, the gear-shifting operation unit 7, a display device 8, a sound output device 9, an operation input unit 10, and the like are installed in a state of facing a seat 2b of a driver as the occupant.

The steering unit 4 is, for example, a steering wheel that protrudes from a dashboard. The accelerating operation unit 5 is, for example, an accelerator that is positioned under the driver's foot. The braking operation unit 6 is, for example, a brake pedal that is positioned under the driver's foot. The gear-shifting operation unit 7 is, for example, a shift lever that protrudes from a center console.

The monitoring device 11 is provided in, for example, a center portion of the dashboard in the vehicle width direction (i.e., the left-right direction). The monitoring device 11 may have, for example, a function of a navigation system, a sound system, or the like. The monitoring device 11 has the display device 8, the sound output device 9, and the operation input unit 10. Furthermore, the monitoring device 11 may have various input units, such as a switch, a dial, a joystick, and a push button.

The display device 8 is configured with a liquid crystal display (LCD), an organic electro luminescence display (OLED), or the like, and is able to display thereon various images based on image data. The sound output device 9 is configured with a speaker or the like, and various types of sound are output from the sound output device 9 based on sound data. The sound output device 9 may be provided at a position other than the monitoring device 11 within the vehicle interior 2a.

The operation input unit 10 is configured with a touch panel or the like, and enables various pieces of information to be input by an occupant. Furthermore, the operation input unit 10 is provided on a display screen of the display device 8, and is able to transmit therethrough an image that is displayed on the display device 8. Accordingly, the operation input unit 10 enables an image displayed on the display screen of the display device 8 to be visually recognized by the occupant. The operation input unit 10 receives input of various pieces of information from the occupant by detecting the occupant's touch operation on the display screen of the display device 8.

Figure 2:
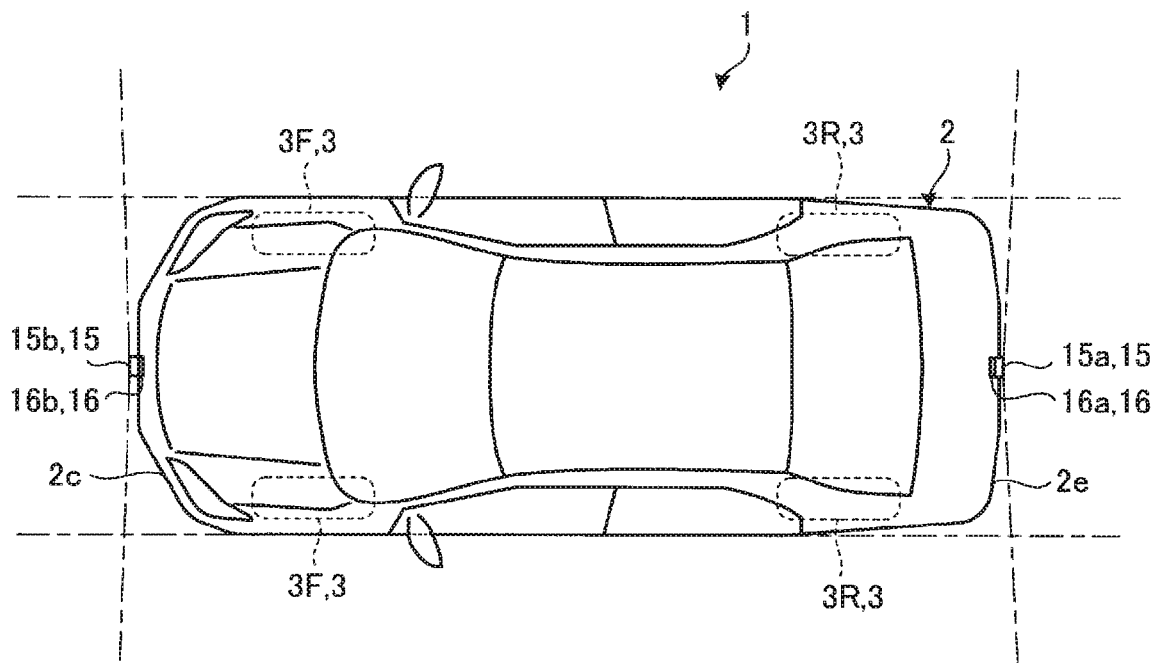
FIG. 2 is a top plan view illustrating the exemplary vehicle according to the embodiment.

FIG. 2 is a top plan view illustrating the exemplary vehicle according to the embodiment. As illustrated in FIGS. 1 and 2, the vehicle 1 is a four-wheeled automobile or the like, and has two left and right front wheels 3F and two left and right rear wheels 3R. All or some of the four wheels 3 can be steered.

The vehicle 1 has a plurality of imaging units 15. Each of the imaging unit 15 is a digital camera that has an imaging device such as a charge-coupled device (CCD) or a CMOS image sensor (CIS). The imaging units 15 are able to image the vicinity of the vehicle 1 at a predetermined frame rate. Then, the imaging units 15 output image data of a captured image obtained by imaging the vicinity of the vehicle 1.

In the embodiment, the imaging units 15 include two imaging units 15a and 15b. The imaging unit 15a is provided on a rear end portion 2e (for example, under a door 2h of the rear trunk) of the vehicle body 2, and is able to image the rear side of the vehicle 1. The imaging unit 15b is provided on a front end portion 2c of the vehicle body 2 (for example, the front bumper), and is able to image the front side of the vehicle 1. Although the imaging units 15 include two imaging units 15a and 15b in the embodiment, the imaging units may include three or more imaging units. In that case, the imaging units 15 may be provided on the side surfaces of the vehicle body 2, and may be set to image the lateral sides of the vehicle 1.

The vehicle 1 has a plurality of distance measuring sensors 16. The distance measuring sensors 16 emit light such as a laser beam, and receive light reflected from an obstacle, such as another vehicle, that is present around the vehicle 1. Then, based on the result of light reception from the obstacle, the distance measuring sensor 16 transmits, to an ECU 24, distance information, which enables a distance from the vehicle 1 to the obstacle to be specified. The distance measuring sensor 16 may transmit the distance from the vehicle 1 to the obstacle to the ECU 24 as the distance information, and may transmit a light-emitting time from the light measuring sensor 16 and a light-receiving time by the light measuring sensor 16 to the ECU 24 as distance information. A distance measuring sensor 16a is provided on the rear end portion 2e of the vehicle body 2 so as to detect a distance to an obstacle existing in rear of the vehicle 1. A distance measuring sensor 16b is provided on the front end portion 2c of the vehicle body 2 so as to detect a distance to an obstacle existing in front of the vehicle 1.

Figure 3:
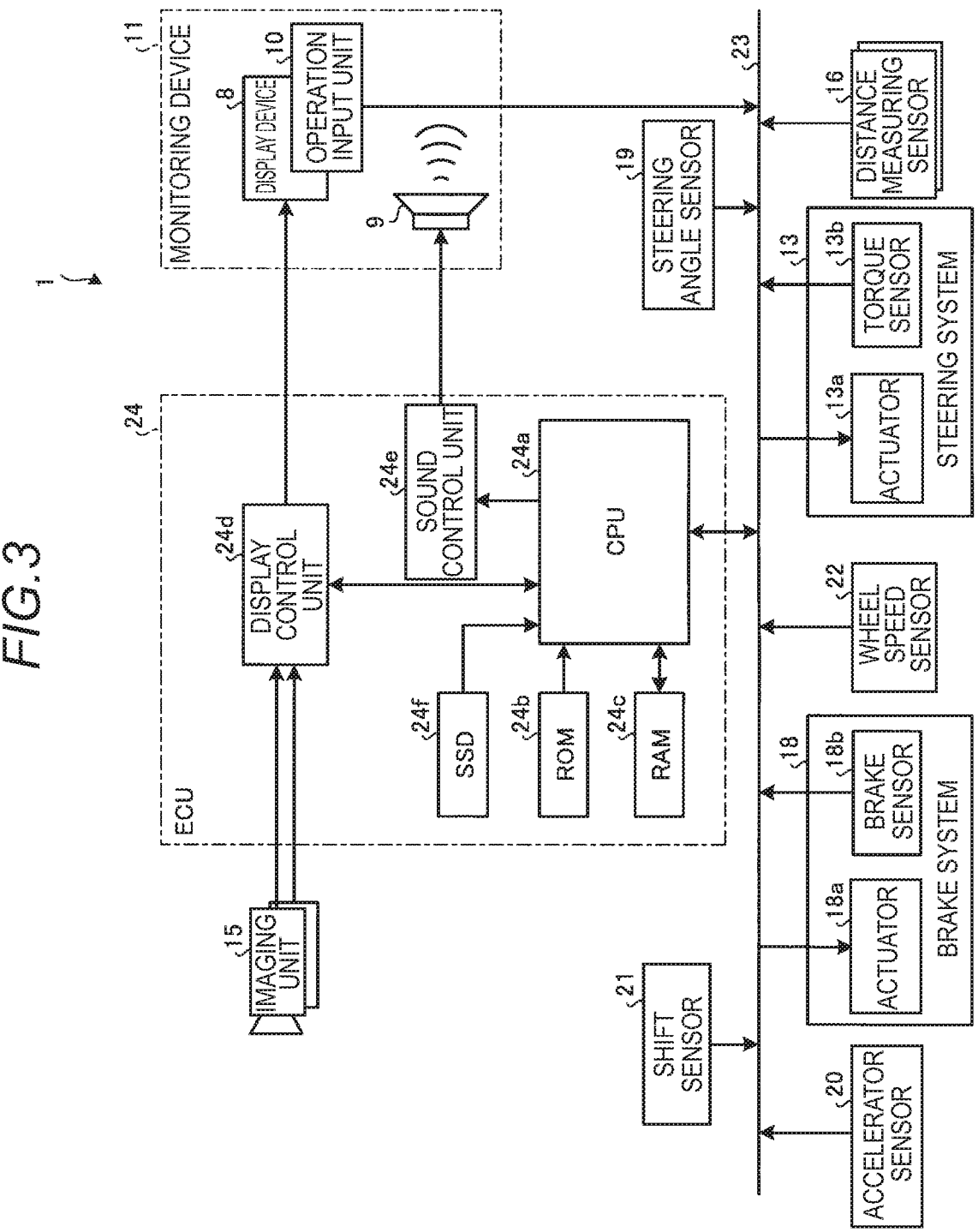
FIG. 3 is a block diagram illustrating an exemplary functional configuration of the vehicle according to the embodiment.

FIG. 3 is a block diagram illustrating an exemplary functional configuration of the vehicle according to the embodiment. As illustrated in FIG. 3, the vehicle 1 includes a steering system 13, a brake system 18, a steering angle sensor 19, an accelerator sensor 20, a shift sensor 21, a wheel speed sensor 22, an in-vehicle network 23, and the electronic control unit (ECU) 24.

The monitoring device 11, the steering system 13, the distance measuring sensor 16, the brake system 18, the steering angle sensor 19, the accelerator sensor 20, the shift sensor 21, the wheel speed sensor 22, and the ECU 24 are electrically connected to each other through the in-vehicle network 23 that is an electric communication line. The in-vehicle network 23 is configured with a controller area network (CAN) or the like.

The steering system 13 is an electric power steering system, a steer-by-wire (SBW) system, or the like. The steering system 13 has an actuator 13a and a torque sensor 13b. Then, the steering system 13 is electrically controlled by the ECU 24 or the like, and operates the actuator 13a so as to add torque to supplement a steering force for the steering unit 4, thereby steering the wheel 3. The torque sensor 13b detects torque that is given to the steering unit 4 by the driver, and transmits the detection result to the ECU 24.

The brake system 18 includes an anti-lock brake system (ABS) that suppresses locking of the brake of the vehicle 1, a sideslip prevention device (electronic stability control (ESC)) that suppresses the sideslip of the vehicle 1 when cornering, an electric brake system that assists the brake by increasing a brake force, and a brake-by-wire (BBW). The brake system 18 has an actuator 18a and a brake sensor 18b. The brake system 18 is electrically controlled by the ECU 24 or the like, and imparts a braking force to the wheels 3 through the actuator 18a. The brake system 18 detects indications of locking of the brake, idling of the wheels 3, sideslip, and the like, from a difference in revolution between the left and right wheels 3 and the like, and thus performs control that suppresses the locking of the brake, the idling of the wheels 3, and the sideslip. The brake sensor 18b is a displacement sensor that detects the position of a brake pedal as a movable portion of the braking operation unit 6, and transmits the position detection result of the brake pedal to the ECU 24.

The steering angle sensor 19 is a sensor that detects a steering amount of the steering unit 4 such as a steering wheel. In the present embodiment, the steering angle sensor 19 is configured with a Hall element or the like, detects a rotation angle of a rotating portion of the steering unit 4 as the steering amount, and transmits the detection result to the ECU 24. The accelerator sensor 20 is a displacement sensor that detects a position of an accelerator as a movable portion of the accelerating operation unit 5, and transmits the detection result to the ECU 24.

The shift sensor 21 is a sensor that detects a position of a movable portion (a bar, an arm, a button, or the like) of the gear-shifting operation unit 7, and transmits the detection result to the ECU 24. The wheel speed sensor 22 is a sensor that has a Hall element or the like and detects the rotation amount of the wheels 3 or the number of revolutions of the wheels 3 per unit time, and transmits the detection result to the ECU 24.

The ECU 24 is an example of the parking assistance apparatus that controls the driving of the vehicle 1 when causing the vehicle 1 to enter a parking position or when causing the vehicle 1 to exit from the parking position by controlling the steering system 13, the brake system 18, and the gear-shifting operation unit 7 through the in-vehicle network 23. The ECU 24 is configured with a computer or the like. Specifically, the ECU 24 includes a central processing unit (CPU) 24a, a read-only memory (ROM) 24b, a random access memory 24c, a display control unit 24d, a sound control unit 24e, and a solid state drive (SSD) 24f. The CPU 24a, the ROM 24b, and the RAM 24c may be mounted on the same circuit substrate.

The CPU 24a reads a program stored in a non-volatile memory device, such as the ROM 24b, and performs various computing processing operations according to the program. For example, the CPU 24a performs an image processing on image data displayed on the display device 8, calculation of a distance to an obstacle existing around the vehicle 1, setting of a parking position, computing of a path to the parking position, for the vehicle 1, and control of the driving of the vehicle 1, and so forth.

Various programs, parameters necessary for executing the programs, and the like are stored in the ROM 24b. Various pieces of data that are used for computing in the CPU 24a are temporarily stored in the RAM 24c. Among computing processings in the ECU 24, the display control unit 24d mainly executes an image processing on image data acquired from the imaging unit 15 and output to the CPU 24a, a conversion of the image data acquired from the CPU 24a into display image data to be displayed on the display device 8, and so forth. Among the computing processings in the ECU 24, the sound control unit 24e mainly executes a processing of sound acquired from the CPU 24a and output to the sound output device 9. The SSD 24f is a rewritable non-volatile memory unit, which continuously stores data acquired from the CPU 24a even in a case where the ECU 24 is powered off.

In the embodiment, the ECU 24 manages entire control of the vehicle 1 through the cooperation of hardware and software (a control program). For example, the ECU 24 identifies a parking frame or the like that is marked on a road around the vehicle 1 from a captured image obtained by the imaging of the imaging unit 15, sets a parking position within the parking frame, and controls the parking of the vehicle 1 to the parking position. Accordingly, the ECU 24 implements a function as the parking assistance apparatus.

Figure 4:
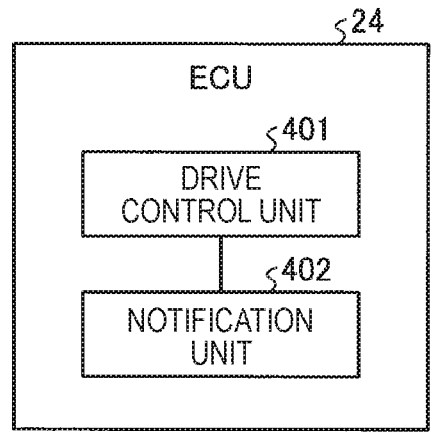
FIG. 4 is a block diagram illustrating an exemplary functional configuration of an ECU which is provided in the vehicle according to the embodiment.

FIG. 4 is a block diagram illustrating an exemplary functional configuration of an ECU which is provided in the vehicle according to the embodiment. As illustrated in FIG. 4, the ECU 24 includes a drive control unit 401 and a notification unit 402. For example, when the CPU 24a executes a parking assistance processing program stored in the ROM 24b or the SSD 24f, thus ECU 24 implements the functions of the drive control unit 401 and the notification unit 402. A part or the overall of each of the drive control unit 401 and the notification unit 402 may be configured with hardware such as a circuit.

In a case where the vehicle 1 enters or exits from a parking space, the drive control unit 401 (an example of a control unit) executes a steering control processing that controls steering of the vehicle 1 by the steering unit 4 through the steering system 13, and a vehicle speed control processing that controls the traveling speed of the vehicle 1 through the accelerating operation unit 5 and the braking operation unit 6. In the embodiment, in the case where the vehicle 1 enters or exits from the parking space, in addition to the steering control processing and the vehicle speed control processing, the drive control unit 401 executes a gear-shifting control processing that controls switching of a shift range of the vehicle 1 by the gear-shifting operation unit 7.

Furthermore, when a predetermined condition is satisfied after the vehicle 1 starts to enter or exit from the parking space, the drive control unit 401 terminates a first processing that is one of the steering control processing and the vehicle speed control processing, and continues a second processing that is the remaining one of the steering control processing and the vehicle speed control processing other than the first processing. Here, the predetermined condition refers to a condition that is set in advance and is that it is determined that the entering or exiting of the vehicle 1 to or from the parking space is completed. Accordingly, after the entering or exiting of the vehicle 1 to or from the parking space is completed, even if the vehicle 1 approaches an obstacle around the vehicle 1 due to the delayed driving of the driver, it is possible to avoid contact between the vehicle 1 and the obstacle by controlling the operation of the vehicle 1 with one of the steering control processing and the vehicle speed control processing, and thus it is possible to safely transfer the driving of the vehicle 1 to the driver. Furthermore, in a case where the entering or exiting of the vehicle to or from the parking space on a sloped road surface is completed, the vehicle speed control processing can be continued such that the braking force exerted on the vehicle 1 can be prevented from being eliminated at the same time as the entering or exiting of the vehicle to or from the parking space is completed. Thus, it is possible to suppress the vehicle 1 from sliding down or running out at the time when the entering or exiting of the vehicle to or from the parking space is completed.

In the case where the predetermined condition is satisfied, the notification unit 402 displays, on the display device 8, at least one of a message indicating that the predetermined condition is satisfied, a message indicating that the first processing is terminated, and a message indicating that the second processing is continued. Accordingly, because a notification that the second processing is continued can be provided after the predetermined condition is satisfied, it is possible to reliably transfer the driving of the vehicle 1 to the driver. In the embodiment, in a case where the predetermined condition is satisfied, the notification unit 402 displays, on the display device 8, at least one of the message that the predetermined condition is satisfied, the message that the first processing is terminated, and the message that the second processing is continued. However, it may be sufficient if at least one of a notification that the predetermined condition is satisfied, a notification that the first processing is terminated, and a notification that the second processing is continued is notified. For example, the notification unit 402 may output, from the sound output device 9, at least one of sound indicating that the predetermined condition is satisfied, sound indicating that the first processing is terminated, and sound indicating that the second processing is continued.

Figure 5:
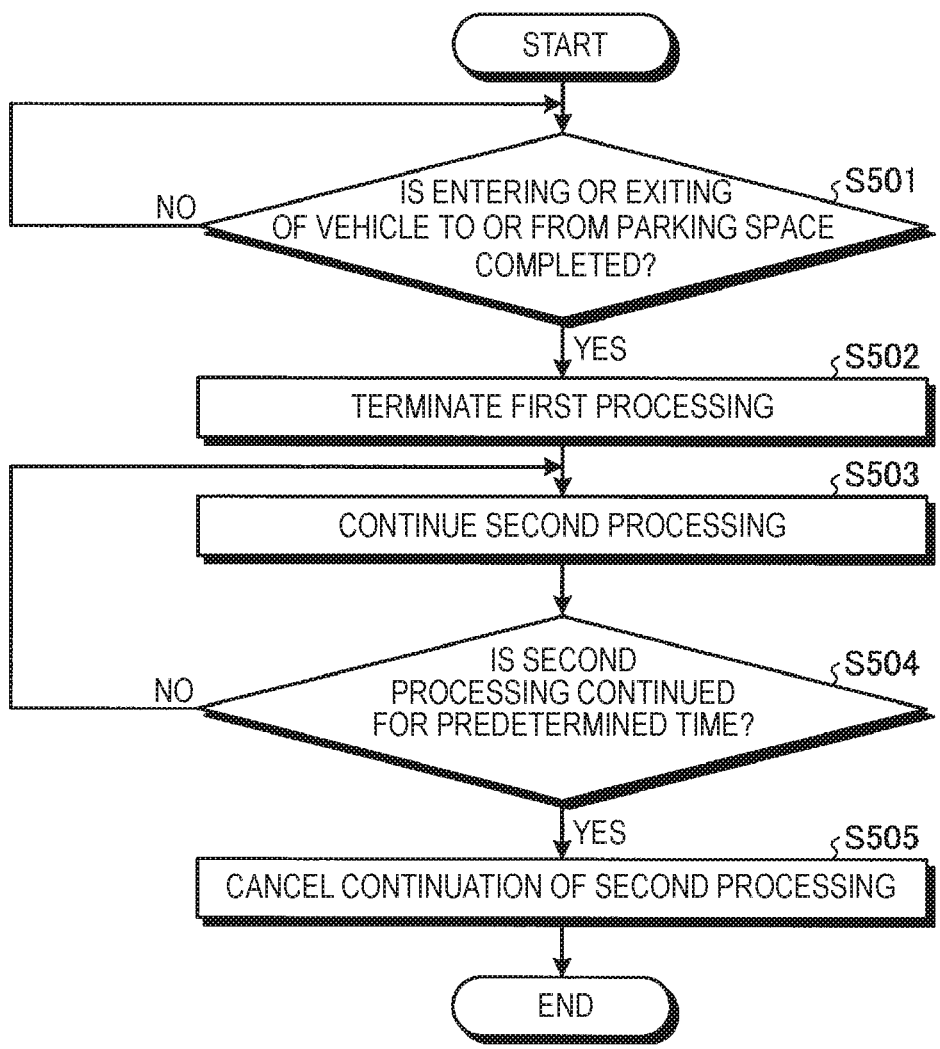
FIG. 5 is a flowchart illustrating an exemplary flow of control processing of entering or exiting of the vehicle to or from a parking space according to the embodiment.

Next, an example of a flow for control processing of the vehicle 1 to enter or exit from the parking space according to the embodiment will be described with reference to FIG. 5. FIG. 5 is a flowchart illustrating an exemplary flow of control processing of the vehicle to enter or exit from the parking space according to the embodiment.

In a case where an instruction to cause the vehicle 1 to enter the parking space is input through the operation input unit 10, the ECU 24 acquires image data from the imaging unit 15. Subsequently, based on the acquired image data, the ECU 24 identifies a parking frame or the like that is marked on the road around the vehicle 1, and sets a parking position within the parking frame. Subsequently, based on the set parking position and the current position of the vehicle 1, the ECU 24 computes a path to the parking position for the vehicle 1. Then, the ECU 24 controls the steering system 13, the brake system 18, and the gear-shifting operation unit 7 via the in-vehicle network 23 and causes the vehicle 1 to move along the computed path, thereby moving the vehicle 1 to the parking position.

Furthermore, in a case where an instruction to cause the vehicle 1 to exit from the parking space is input via the operation input unit 10, the ECU 24 acquires image data from the imaging unit 15. Subsequently, based on the acquired image data, the ECU 24 identifies an obstacle existing around the vehicle 1, and sets a position in which the obstacle is easily avoidable when the vehicle 1 is at the time of exiting, as an exiting position. For example, in a case where an instruction to cause the vehicle 1 to exit from the parking space from a state where the vehicle 1 is in parallel parking is input, the ECU 24 sets a position in which the opposite ends of the front bumper of the vehicle 1 in the vehicle-width direction protrude to a lane to which the vehicle 1 joins is set to an exiting position. Subsequently, based on the set exiting position and the current position of the vehicle 1, the ECU 24 computes a path of the vehicle 1 to the exiting position. Then, the ECU 24 controls the steering system 13, the brake system 18, and gear-shifting operation unit 7 via the in-vehicle network 23 so as to cause the vehicle 1 to move along the computed path, thereby moving the vehicle 1 to the exiting position.

After the the vehicle 1 starts to enter or exit from the parking space, the drive control unit 401 determines whether or not the entering or exiting of the vehicle to or from the parking space is completed (Step S501). In the embodiment, in the case where the vehicle 1 enters the parking space, when the current position of the vehicle 1 is the parking position, the drive control unit 401 determines that the entering of the vehicle 1 to the parking space is completed. Furthermore, in the case where the vehicle exit from the parking space, when the current position of the vehicle 1 is the exiting position, the drive control unit 401 determines that the vehicle 1 has left the parking space.

Furthermore, in the embodiment, even if steering of the steering unit 4, operation of the accelerating operation unit 5 (an example of speed operation of the vehicle), or operation of the braking operation unit 6 (an example of the speed operation of the vehicle) is performed by the driver of the vehicle 1 after the vehicle 1 starts to enter or exit from the parking space and before the entering or exiting of the vehicle 1 to or from the parking space is completed (i.e., before a predetermined condition is satisfied), the drive control unit 401 continuously performs both of the operation control processing and the vehicle speed control processing. Accordingly, since the driving of the vehicle 1 is controlled even if the driving of the vehicle 1 is performed by the driver before entering or exiting of the vehicle 1 to or from the parking space is completed, it is possible to prevent the vehicle 1 from running out to a lane and to prevent the vehicle 1 from rapidly approaching an obstacle due to the delayed driving of the driver before the entering or exiting of the vehicle 1 to or from the parking space is completed.

Then, when it is determined that the entering or exiting of the vehicle 1 to or from the parking space is completed ("Yes" in Step S501), the drive control unit 401 sets a processing, which is one of the steering control processing and the vehicle speed control processing and has been set in advance, as a first processing, and terminates the first processing (Step S502). Moreover, the drive control unit 401 sets a processing, which is the remaining one of the steering control processing and the vehicle speed control processing and is other than the first processing, as a second processing, and continues the second processing (Step S503). Then, in a case where it is detected that the vehicle 1 has approached an obstacle (e.g., another vehicle that is traveling on a lane to which the vehicle 1 joins), or the like, the drive control unit 401 avoids a collision of the vehicle 1 with the obstacle with the second processing. For example, in a case where the second processing is the steering control processing, the drive control unit 401 steers the steering unit 4 in such a manner that the vehicle 1 does not collide with the obstacle. Furthermore, in a case where the second processing is the vehicle speed control processing, the drive control unit 401 sets the traveling speed of the vehicle 1 to 0 such that the vehicle 1 does not collide with the obstacle. The drive control unit 401 is configured to detect that the vehicle 1 approaches the obstacle based on the image data acquired from the imaging unit 15 or the distance information output from the distance measuring sensor 16. Subsequently, the drive control unit 401 determines whether or not the second processing is continued for a predetermined time (for example, ten seconds) after a predetermined condition is satisfied (Step S504). In other words, the drive control unit 401 determines whether or not a predetermined time has elapsed after the predetermined condition is satisfied.

Then, when it is determined that the second processing has been continued for a predetermined time after the predetermined condition is satisfied ("Yes" in Step S504), in other words, when it is determined the predetermined time has elapsed after the predetermined condition is satisfied, the drive control unit 401 cancels the continuation of the second processing (Step S505). In the embodiment, the drive control unit 401 performs an operation of canceling the continuation of the second processing when an operation of cancelling the continuation of the second processing is performed by the driver of the vehicle 1 or an operation of the vehicle 1 to cancel continuing the second processing is performed, while the second processing is continued after the predetermined condition is satisfied. Accordingly, when the operation of canceling continuation of the second processing is performed by the driver of the vehicle 1 after the predetermined condition is satisfied, the driver can be ready to drive the vehicle 1, and even if both of the steering control processing and the vehicle speed control processing are terminated, the continuation of the second processing is terminated because the possibility that the driving of the vehicle 1 is delayed is low.

For example, in the case where the steering unit 4 is operated by the driver while the steering control processing as the second processing is continued after the predetermined condition is satisfied, the drive control unit 401 cancels the continuation of the steering control processing. Furthermore, in a case where the accelerating operation unit 5 or the controlling operation unit 6 is operated while the vehicle speed control processing as the second processing is continued after the predetermined condition is satisfied, the drive control unit 401 cancels the continuation of the braking control processing. Furthermore, in a case where control, which is a processing other than the first processing and the second processing and avoids a collision with an obstacle is performed by the ECU 24 or the like and the vehicle 1 performs the operation of canceling the continuation of the second processing, while the steering control processing as the second processing is in progress after the predetermined condition is satisfied, the drive control unit 401 cancels the continuation of the steering control processing. Furthermore, in a case where control, which is a processing other than the first processing and the second processing and avoids a collision with an obstacle, is performed by the ECU 24 or the like, and the vehicle 1 performs the operation of canceling the continuation of the second processing while the vehicle speed control processing as the second processing is continued after the predetermined condition is satisfied, the drive control unit 401 cancels the continuation of the vehicle speed control processing.

Figure 6:
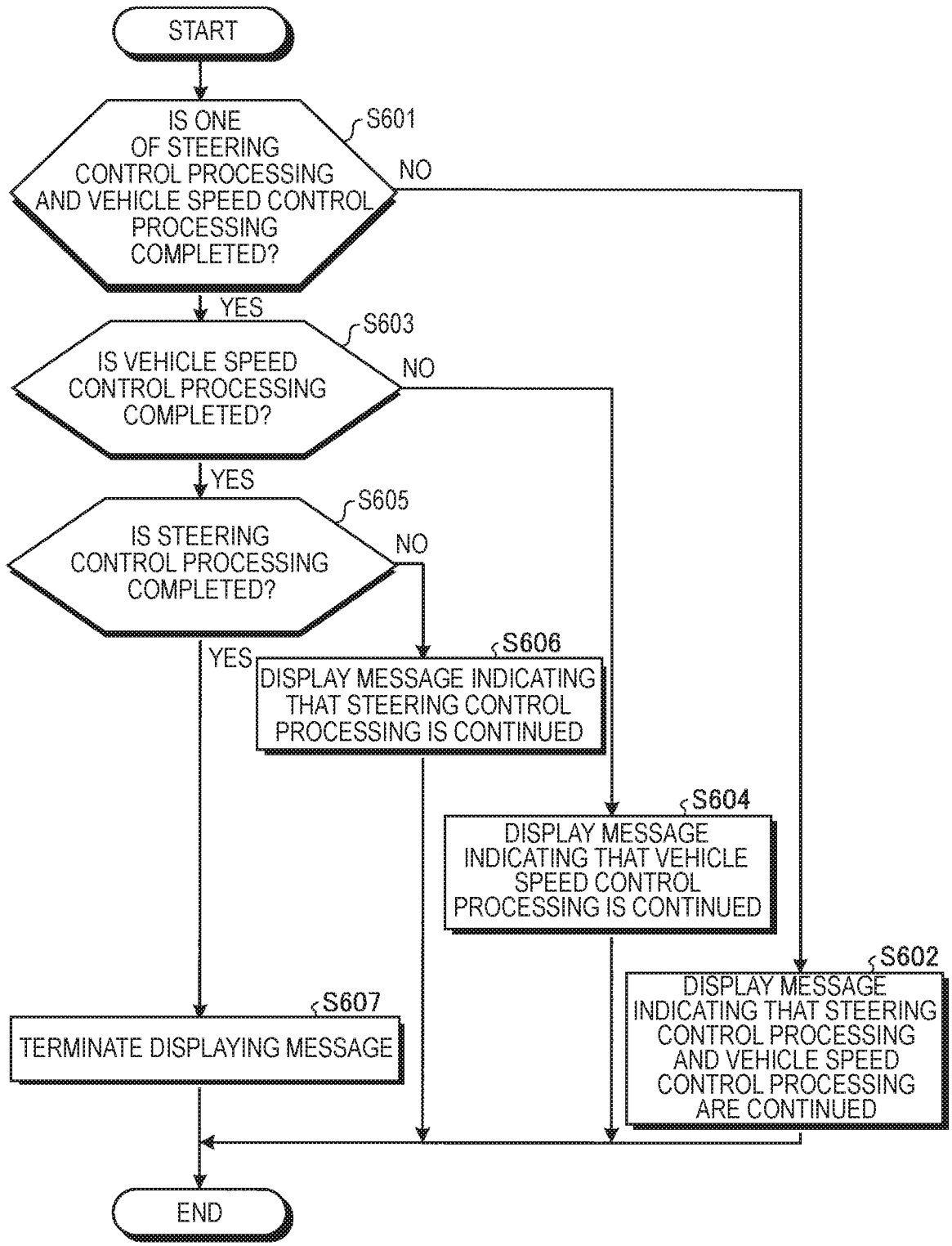
FIG. 6 is a flowchart illustrating an exemplary flow of display processing of a message in the vehicle according to the embodiment.
Figure 7:
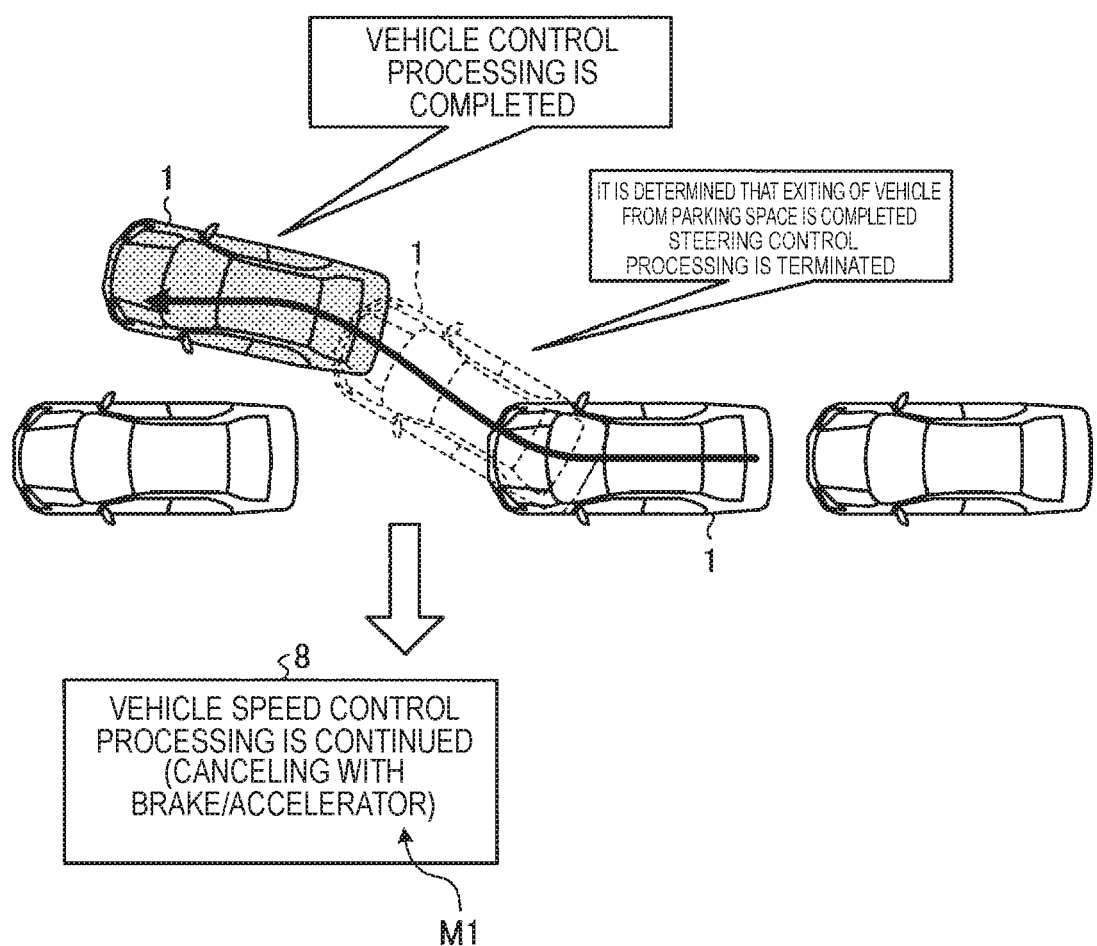
FIG. 7 is a view for describing an exemplary display processing of a message in the vehicle according to the embodiment.
Figure 8:
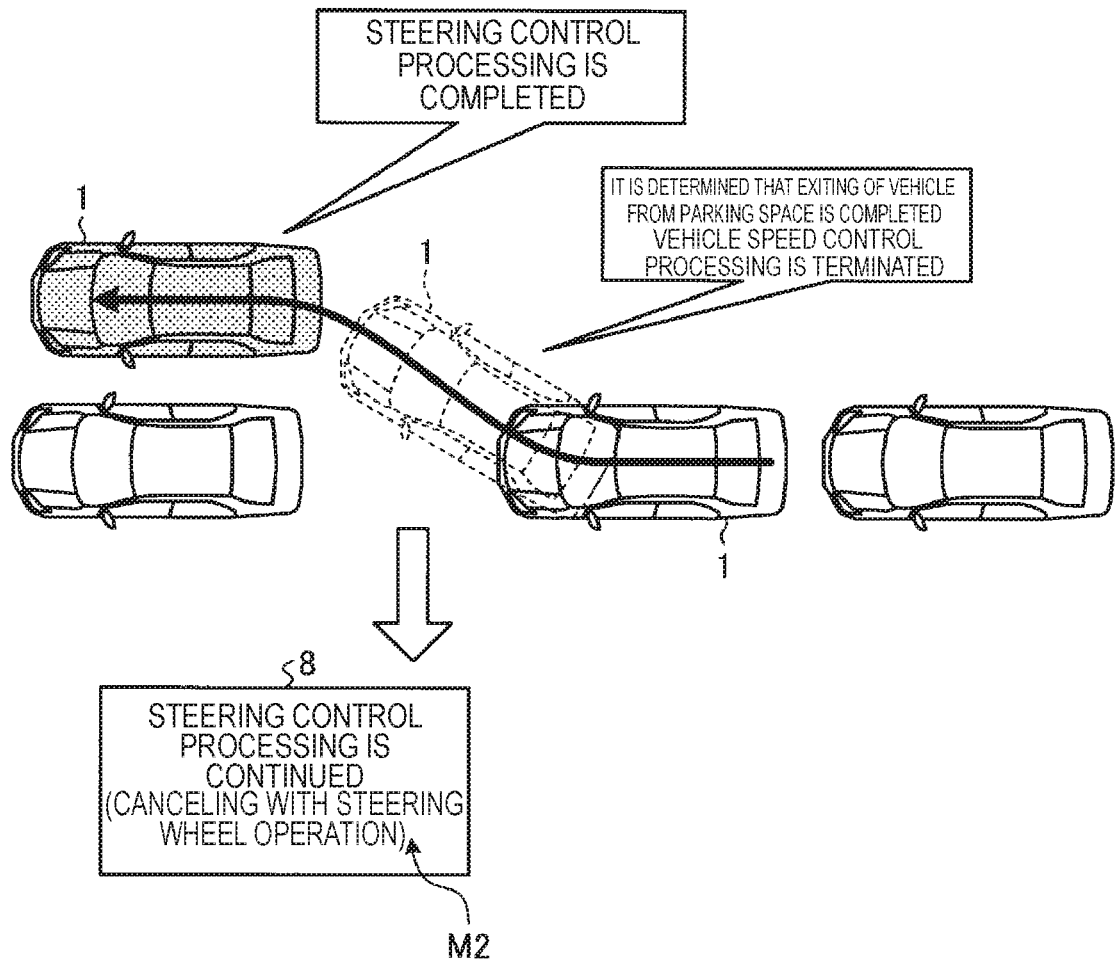
FIG. 8 is a view for describing an exemplary display processing of a message in the vehicle according to the embodiment.
Figure 9:
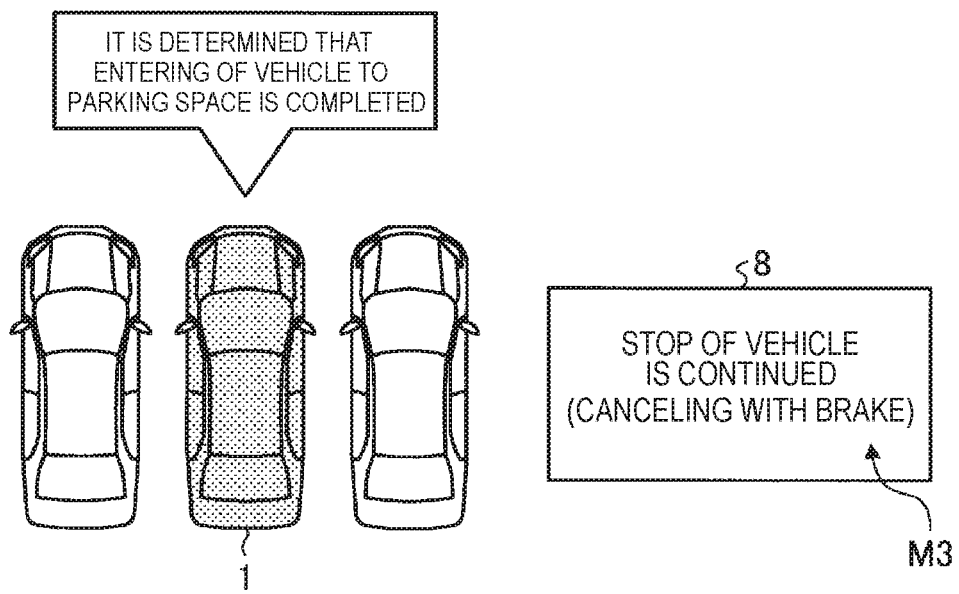
FIG. 9 is a view for describing an exemplary display processing of a message in the vehicle according to the embodiment.

Next, a processing of displaying a message on the display device 8 in the vehicle 1 according to the embodiment in a case where a predetermined condition is satisfied will be described with reference to FIGS. 6 to 9. FIG. 6 is a flowchart illustrating an exemplary flow of display processing of a message in the vehicle according to the embodiment. FIGS. 7 to 9 are views for describing an exemplary display processing of a message in the vehicle according to the embodiment.

The notification unit 402 determines whether or not one of the steering control processing and the vehicle speed control processing is completed (Step S601). In a case where both of the steering control processing and the vehicle speed control processing are performed ("No" in Step S601), the notification unit 402 displays, on the display device 8, a message indicating that both of the steering control processing and the vehicle speed control processing are continued (Step S602). In a case where it is determined that one of the steering control processing and the vehicle speed control processing is completed ("Yes" in Step S601), the notification unit 402 determines whether or not the vehicle speed control processing is completed (Step S603).

Subsequently, in a case where the steering control processing is the first processing and the vehicle speed control processing as the second processing is continued, that is, in case where the vehicle has left the parking space and the vehicle speed control processing is not completed ("No" in Step S603), as illustrated in FIG. 7, the notification unit 402 displays, on the display device 8, a message M1 indicating that the vehicle speed control processing is continued (Step S604). In a case where the vehicle speed control processing is completed (Yes in Step S603), the notification unit 402 determines whether or not the steering control processing is completed (Step S605).

In a case where the vehicle speed control processing is the first processing and the steering control processing is continued as the second processing, that is, in case where it is determined that the vehicle 1 has left the parking space and the steering control processing is not completed (No in Step S605), as illustrated in FIG. 8, the notification unit 402 displays, on the display device 8, a message M2 indicating that the steering control processing is continued (Step S606).

In a case where both of the steering control processing and the vehicle speed control processing are completed ("Yes" in Step S605), the notification unit 402 terminates displaying of various messages on the display device 8 (Step S607). In a case where both of the steering control processing and the vehicle speed control processing are completed, or in a case where the second processing is continued for a predetermined time after a predetermined condition is satisfied, the notification unit 402 may display, on the display device 8, information indicating that the second processing is terminated.

Furthermore, when the vehicle 1 enters the parking position, in a case where it is determined that the entering of the vehicle 1 to the parking position is completed and the stop state of the vehicle 1 is continued by the vehicle speed control processing, as illustrated in FIG. 9, the notification unit 402 may display, on the display device 8, a message M3 indicating that the vehicle 1 is in the stopping state by the vehicle speed control processing.

In this manner, according to the vehicle 1 of the present embodiment, even if the delay in driving is caused by the driver and thus the vehicle approaches an obstacle around the vehicle 1 after the entering or exiting of the vehicle 1 to or from the parking space is completed, since the operation of the vehicle 1 is controlled with one of the steering control processing and the vehicle speed control processing such that the contact between the vehicle 1 and the obstacle can be avoided, the vehicle 1 can be safely transferred to the driver after the entering or exiting of the vehicle 1 to or from the parking space is completed.

A program executed in the vehicle 1 according to the present embodiment is provided in a state of being embedded in advance in the ROM 24*b* or the like, but may be configured to be provided in a state of being recorded on a computer-readable recording medium, such as a CD-ROM, a flexible disk (FD), a CD-R, or a digital versatile disk (DVD), as a file of a program-installable or program-executable format.

Moreover, the program executed in the vehicle 1 according to the present embodiment may be configured to be stored on a computer connected to a network such as the Internet and to be provided by being downloaded via the network. Furthermore, the program executed in the vehicle 1 according to the present embodiment may be configured to be provided or distributed via a network such as the Internet.

The program executed in the vehicle 1 according to the present embodiment has a modular configuration in which each of the units (the drive control unit 401 and the notification unit 402) described above is included. Actual hardware is configured such that, when the CPU 24*a* reads and executes the program from the ROM 24*b* described above, each of the units described above is loaded on to a main memory device, and the drive control unit 401 and the notification unit 402 are generated on the main memory device.

A parking assistance apparatus according to an aspect of this disclosure includes, as an example, a control unit configured to: perform a steering control processing that controls steering of a vehicle and a vehicle speed control processing that controls a traveling speed of the vehicle when the vehicle enters or exits from a parking space; terminate a first processing that is one of the steering control processing and the vehicle speed control processing when a predetermined condition is satisfied after the vehicle starts to enter or exit from the parking space; and continue a second processing that is one of the steering control processing and the vehicle speed control processing other than the first processing. Accordingly, as an example, after the entering or exiting of the vehicle to or from the parking space is completed, the driving of the vehicle can be safely transferred to the driver.

In the parking assistance apparatus, as an example, the predetermined condition is that it is determined that the entering or exiting of the vehicle to or from the parking space is completed. Accordingly, as an example, after the entering or exiting of the vehicle to or from the parking space is completed, the driving of the vehicle can be safely transferred to the driver.

As an example, the parking assistance apparatus further includes a notification unit configured to provide at least one of a notification that the predetermined condition is satisfied, a notification that the first processing is terminated, and a notification that the second processing is continued, in a case where the predetermined condition is satisfied. Accordingly, as an example, it is possible to reliably transfer the driving of the vehicle to the driver.

In the parking assistance apparatus, as one example, the notification unit outputs at least one of sound indicating that the predetermined condition is satisfied, sound indicating that the first processing is terminated, and sound indicating that the second processing is continued, in the case where the predetermined condition is satisfied.

In the parking assistance apparatus, as one example, the notification unit displays, on a display device, at least one of a message indicating that the predetermined condition is satisfied, a message indicating that the first processing is terminated, and a message indicating that the second processing is continued, in the case where the predetermined condition is satisfied.

In the parking assistance apparatus, as one example, the control unit cancels continuation of the second processing, in a case where an operation of canceling the continuation of the second processing is performed by a driver of the vehicle or an operation of the vehicle to cancel the continuation of the second processing is performed while the second processing is continued after the predetermined condition is satisfied. Accordingly, the driver can be ready to drive the vehicle. Thus, even if both of the steering control processing and the vehicle speed control processing are terminated, the continuation of the second processing can be terminated in the case where the possibility that the driving of the vehicle is delayed is low.

In the parking assistance apparatus, as an example, the control unit cancels the continuation of the second processing when the second processing is continued for a predetermined time after the predetermined condition is satisfied. Accordingly, the driver can be ready to drive the vehicle. Thus, even if both of the steering control processing and the vehicle speed control processing are terminated, the continuation of the second processing can be terminated in a case where the possibility that the driving of the vehicle is delayed is low.

In the parking assistance apparatus, as an example, the control unit continues both of the operation control processing and the vehicle speed control processing even if steering or speed operation of the vehicle is performed by the driver of the vehicle before the predetermined condition is satisfied. Accordingly, as an example, it is possible to prevent the vehicle from running out to a lane, and from rapidly approaching an obstacle due to the delayed driving of the driver before the entering or exiting of the vehicle to or from the parking space is completed.

Although the embodiment of the present disclosure has been described, this embodiment is provided as an example without any intention to limit the scope of the disclosure. This novel embodiment can be implemented as various other forms, and various omissions, substitutions, and modifications can be made on the novel embodiment without departing from the gist of the disclosure. These embodiments are included in the scope and gist of the disclosure, and are also included in the disclosure defined in claim and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance apparatus comprising:
a control unit configured to:
perform a steering control processing that controls steering of a vehicle and a vehicle speed control processing that controls a traveling speed of the vehicle when the vehicle exits from a parking space;
terminate a first processing that is one of the steering control processing and the vehicle speed control processing when a predetermined condition is satisfied after the vehicle starts to exit from the parking space; and
continue a second processing that is one of the steering control processing and the vehicle speed control processing other than the first processing when the predetermined condition is satisfied,
wherein the predetermined condition is that it is determined that exiting of the vehicle from the parking space is completed.

2. The parking assistance apparatus according to claim 1, further comprising:
a notification unit configured to provide at least one of a notification that the predetermined condition is satisfied, a notification that the first processing is terminated, and a notification that the second processing is continued, in a case where the predetermined condition is satisfied.

3. The parking assistance apparatus according to claim 2, wherein the notification unit outputs at least one of sound indicating that the predetermined condition is satisfied, sound indicating that the first processing is terminated, and sound indicating that the second processing is continued, in the case where the predetermined condition is satisfied.

4. The parking assistance apparatus according to claim 2, wherein the notification unit displays, on a display device, at least one of a message indicating that the predetermined condition is satisfied, a message indicating that the first processing is terminated, and a message indicating that the second processing is continued, in the case where the predetermined condition is satisfied.

5. The parking assistance apparatus according to claim 2, wherein the control unit cancels continuation of the second processing, in a case where an operation of canceling the continuation of the second processing is performed by a driver of the vehicle or an operation of the vehicle to cancel the continuation of the second processing is performed while the second processing is continued after the predetermined condition is satisfied.

6. The parking assistance apparatus according to claim 5, wherein the control unit cancels the continuation of the second processing when the second processing is continued for a predetermined time after the predetermined condition is satisfied.

7. The parking assistance apparatus according to claim 2, wherein the control unit cancels the continuation of the second processing when the second processing is continued for a predetermined time after the predetermined condition is satisfied.

8. The parking assistance apparatus according to claim 1, wherein the control unit cancels continuation of the second processing, in a case where an operation of canceling the continuation of the second processing is performed by a driver of the vehicle or an operation of the vehicle to cancel the continuation of the second processing is performed while the second processing is continued after the predetermined condition is satisfied.

9. The parking assistance apparatus according to claim 8, wherein the control unit cancels the continuation of the second processing when the second processing is continued for a predetermined time after the predetermined condition is satisfied.

10. The parking assistance apparatus according to claim 1, wherein the control unit cancels the continuation of the second processing when the second processing is continued for a predetermined time after the predetermined condition is satisfied.

11. The parking assistance apparatus according to claim 1, wherein the control unit continues both of the operation control processing and the vehicle speed control processing even if steering or speed operation of the vehicle is performed by the driver of the vehicle before the predetermined condition is satisfied.

12. The parking assistance apparatus according to claim 1, wherein the first processing is the vehicle speed control processing.

* * * * *